(12) United States Patent
Jiao et al.

(10) Patent No.: US 11,366,082 B2
(45) Date of Patent: Jun. 21, 2022

(54) NON-LINEAR LAMB WAVE MIXING METHOD FOR MEASURING STRESS DISTRIBUTION IN THIN METAL PLATES

(71) Applicant: BEIJING UNIVERSITY OF TECHNOLOGY, Beijing (CN)

(72) Inventors: Jingpin Jiao, Beijing (CN); Li Li, Beijing (CN); Xiang Gao, Beijing (CN); Quan Cheng, Beijing (CN); Cunfu He, Beijing (CN); Bin Wu, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 17/516,520

(22) Filed: Nov. 1, 2021

(65) Prior Publication Data

US 2022/0049996 A1    Feb. 17, 2022

Related U.S. Application Data

(63) Continuation of application No. PCT/CN2020/087352, filed on Apr. 28, 2020.

(30) Foreign Application Priority Data

May 20, 2019  (CN) .......................... 201910416965.1

(51) Int. Cl.
*G01N 29/04* (2006.01)
*G01N 29/44* (2006.01)
(Continued)

(52) U.S. Cl.
CPC ........... *G01N 29/041* (2013.01); *G01N 29/12* (2013.01); *G01N 29/341* (2013.01);
(Continued)

(58) Field of Classification Search
CPC .... G01N 29/12; G01N 29/48; G01N 29/4445; G01N 29/041
See application file for complete search history.

(56) References Cited

U.S. PATENT DOCUMENTS

| | | | |
|---|---|---|---|
| 5,154,081 A | 10/1992 | Thompson et al. | |
| 2014/0230556 A1* | 8/2014 | Yamamoto | G01N 29/4427 73/602 |

FOREIGN PATENT DOCUMENTS

| | | |
|---|---|---|
| CN | 104807570 A | 7/2015 |
| CN | 104807888 A | 7/2015 |

(Continued)

OTHER PUBLICATIONS

International Search Report of PCT/CN2020/087352.

*Primary Examiner* — Paul M. West
(74) *Attorney, Agent, or Firm* — J.C. Patents

(57) ABSTRACT

The invention discloses a non-linear Lamb wave mixing method for measuring stress distribution in thin metal plates. The method is suitable for stress distribution detection and stress concentration area positioning in a plate structure and belongs to the field of nondestructive detection. The steps of the present invention is: first determines the excitation frequencies of two fundamental waves according to the measured object and the nonlinear Lamb wave mixing resonance conditions; the left and right ends of the test piece are oppositely excited two rows of A0 mode waves, and the excitation signal receive the sum-frequency S0 signal at a certain position to detect non-linear mixing stress of the plate structure; by changing the excitation time delay of the excitation signal, perform mixing scan on different positions of the test piece to extract the mixing wave amplitude; finally, according to the variation of amplitude of sum frequency difference signal with mixing position to realize (Continued)

Schematic diagram of experimental system the detection of stress distribution of metal plate and the positioning of the stress concentration area.

1 Claim, 3 Drawing Sheets

(51) Int. Cl.
    *G01N 29/48*     (2006.01)
    *G01N 29/12*     (2006.01)
    *G01N 29/34*     (2006.01)

(52) U.S. Cl.
    CPC ......... *G01N 29/4445* (2013.01); *G01N 29/48* (2013.01); *G01N 2291/0234* (2013.01); *G01N 2291/0427* (2013.01); *G01N 2291/104* (2013.01); *G01N 2291/2632* (2013.01)

(56) References Cited

FOREIGN PATENT DOCUMENTS

| CN | 105372330 A | 3/2016 |
| CN | 107576384 A | 1/2018 |
| CN | 109060206 A | 12/2018 |
| CN | 110108402 A | 9/2019 |

\* cited by examiner

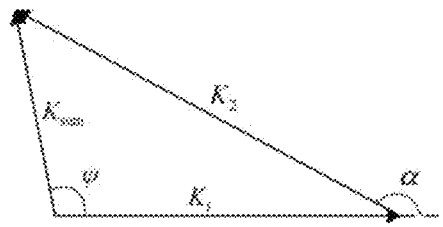 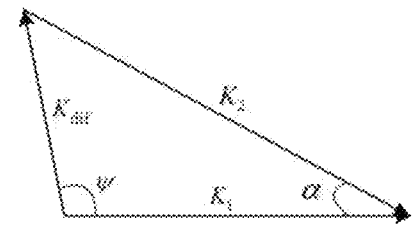
Fig. 1a   sum component         Fig. 1b   difference component
Fig.1 Geometric representation of two incident waves and generated mixing frequency wave
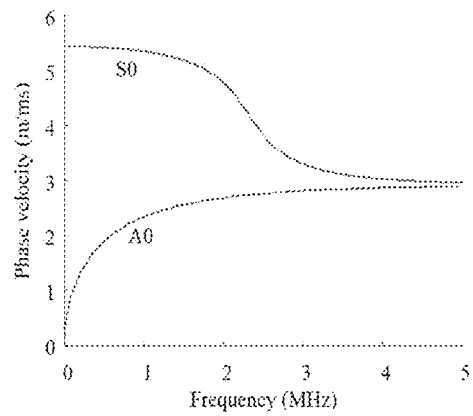 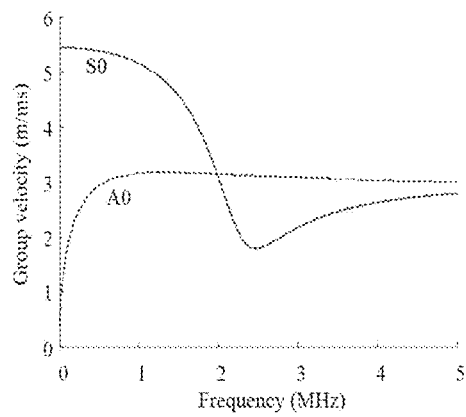
Fig. 2a   Phase velocity dispersion curve         Fig. 2b   Group velocity dispersion curve
Fig.2 Dispersive curves for a 1-mm-thick aluminum plate
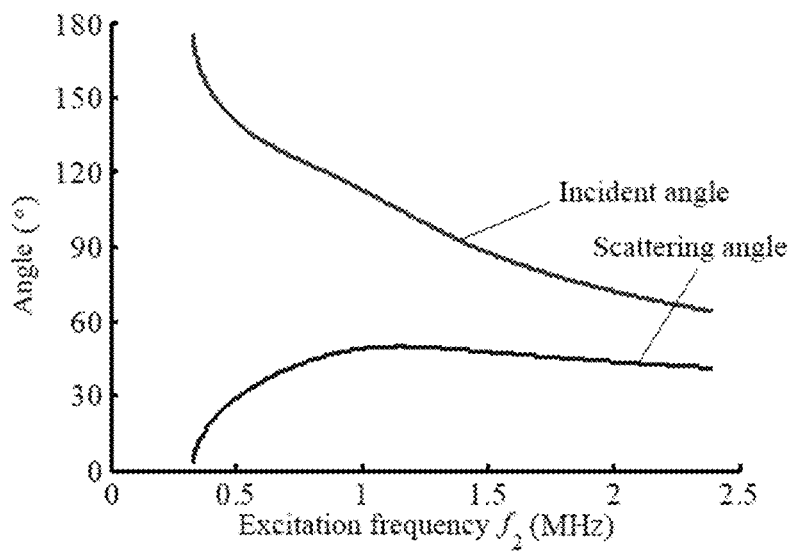
Fig.3 Resonant conditions for two A0 waves to generate sum-frequency S0 wave

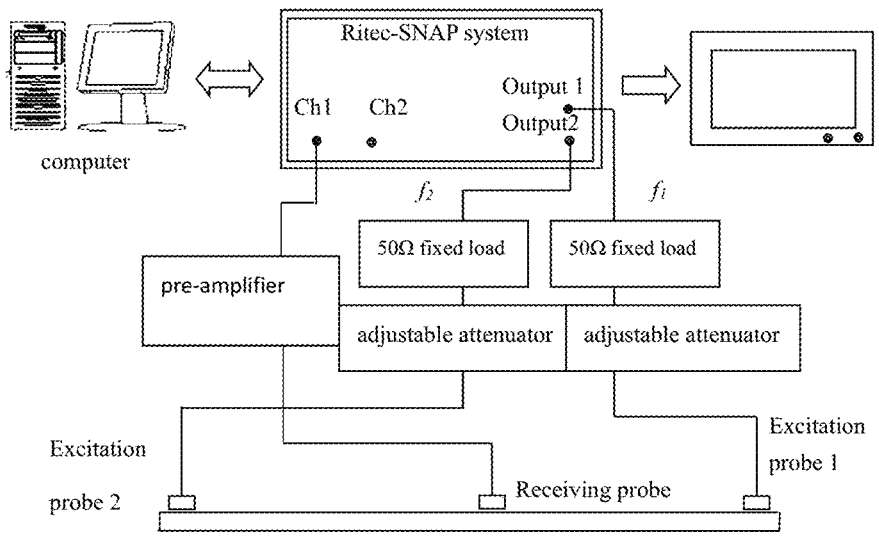
Fig. 4 Schematic diagram of experimental system
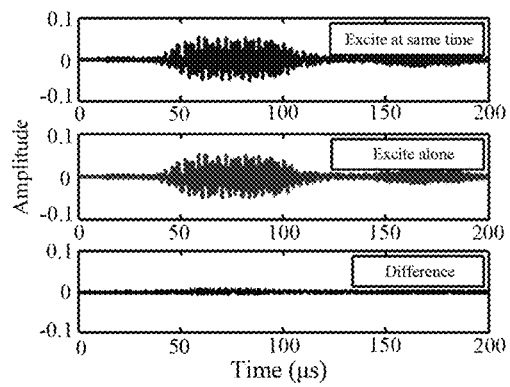
Fig. 5a Time domain signal
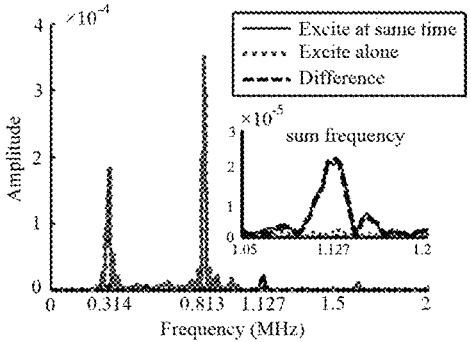
Fig. 5b Spectral signal
Fig.5 Received signal
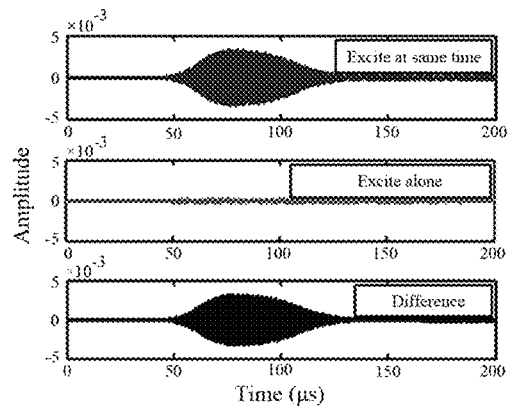
Fig. 6a Filtered after the time domain signal
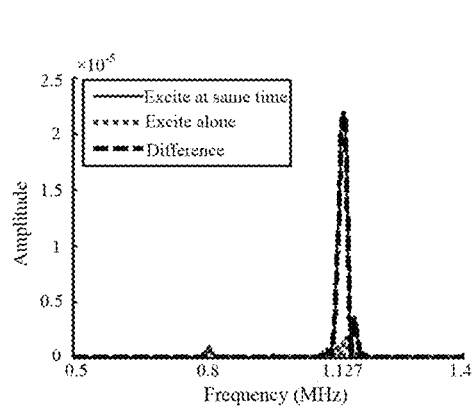
Fig. 6b Filtered after the frequency domain signal
Fig.6 Bandpass filtered signal

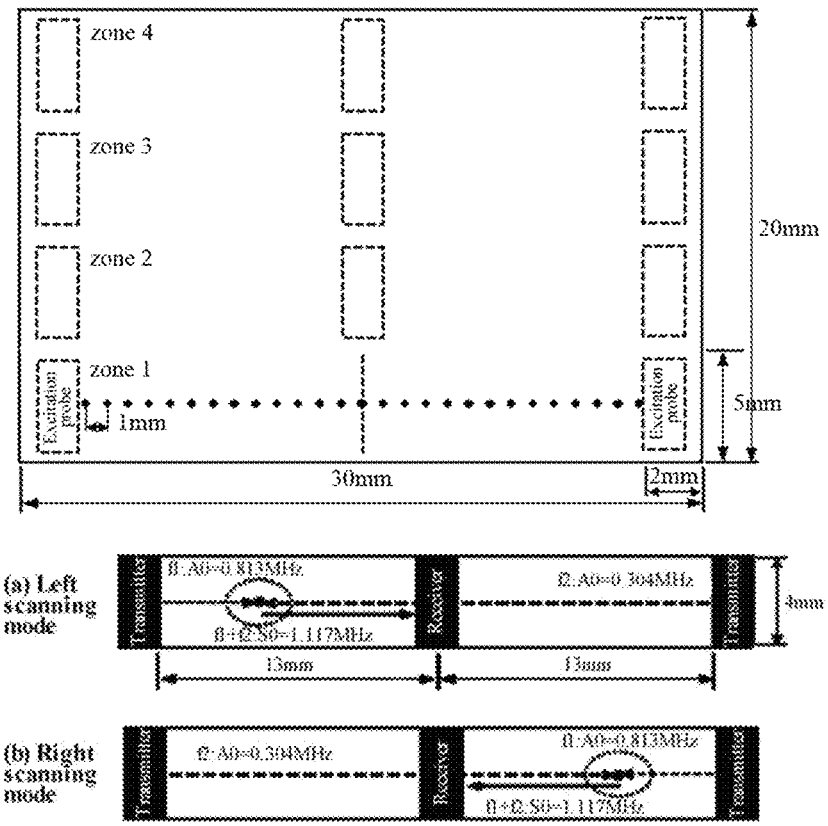
Fig.7 Schematic diagram of scanning scheme
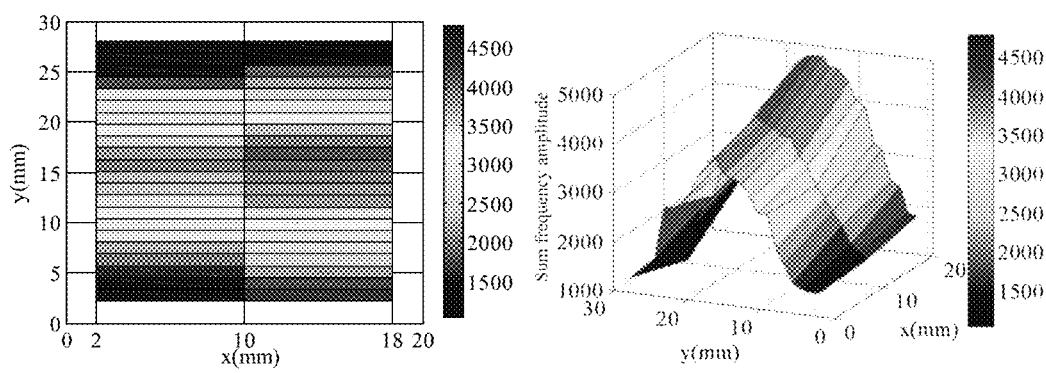
Fig. 8a  Two-dimensional diagram     Fig. 8b  Three-dimensional diagram
Fig.8 Nonlinear ultrasonic detection results

NON-LINEAR LAMB WAVE MIXING METHOD FOR MEASURING STRESS DISTRIBUTION IN THIN METAL PLATES

CROSS-REFERENCE TO RELATED APPLICATIONS

This application is a continuation of International Application No. PCT/CN2020/087352, filed on Apr. 28, 2020, which claims priority to Chinese Patent Application No. 201910416965.1, filed on May 20, 2019. The contents of the above applications are hereby incorporated by reference in their entireties and form a part of this specification.

TECHNICAL FIELD

The invention relates to a non-linear Lamb wave mixing method for measuring stress distribution in thin metal plates. The method is suitable for stress distribution detection and locating stress concentration area in plate structure. It belongs to the field of non-destructive testing.

BACKGROUND TECHNIQUE

As a common structural form, metal plate structure has good formability and weldability, and is widely used in various major infrastructures, such as ship shells, aircraft fuselages and doors, and large oil storage tank shells, etc. During use, under the combined action of static force and cyclic load, internal medium and external working environment, metal components are prone to stress concentration at sudden changes and rigid-constrained positions, and they evolve into fatigue cracks or fractures, which lead to failure of structural components. Thus causing catastrophic accidents. Therefore, in order to eliminate potential safety hazards, an effective method is urgently needed to achieve stress detection of metal plate structures.

Stress testing methods are divided into destructive stress testing methods (such as drilling method or blind hole method) and non-destructive testing methods according to the damage to the tested component. The drilling method is a semi-non-destructive testing method in which a strain gauge is installed on the surface of test piece, and the strain released when a hole is drilled near the strain gauge is measured, and then the strain is converted into stress.

This method has strict requirements on drilling process and tools. There are many interference factors in the field test. Non-destructive testing methods include X-ray diffraction method, magnetic measurement method and ultrasonic method. The X-ray detection depth is extremely shallow, only 10~35 μm, which has certain radiation damage to the human body, and is mainly used for stress detection of surface coatings, films, etc. Magnetic measurement methods include magnetic Barkhausen effect method, magnetoacoustic emission method, hysteresis method, etc., which use ferromagnetic materials to rotate and shift magnetic domains during magnetization. Once there is a load, the magnetic domains rotation and displacement will produce added resistance, at this time the magnetization curve changes under load. The measurement stress is limited by magnetization conditions and it is difficult to detect, the measurement stability is relatively poor, the data is scattered, and it can only be used for the detection of ferromagnetic materials.

Ultrasonic detection method is currently used method with more development potential. Ultrasonic testing technology is divided into two categories: traditional linear ultrasonic testing technology and nonlinear ultrasonic testing technology. Traditional linear ultrasound utilizes the propagation characteristics of ultrasonic waves in tested specimen. Load changes the refraction of sound waves, which in turn leads to changes in the sound velocity and frequency spectrum of ultrasonic waves received by testing equipment. The stress is calculated back from these changes. Song et al. [Song W, Pan Q, Chunguang X U, et al. Benchmark of Residual Stress for Ultrasonic Nondestructive Testing[C]/Nondestructive Evaluation/testing: New Technology&Application.0.] conducted theoretical and experimental research on the acoustic elastic theory to detect residual stress. Xu Chunguang and others [Xu Chunguang, Song Wentao, Pan Qinxue, Li Xiao, Jin Xin, Liu Haiyang. Ultrasonic detection method of residual stress[J]. Non-destructive testing, 2014, 36(07): 25-31.] establish and use ultrasonic stress detection and calibration system to detect residual stress of steel, aluminum alloy and other samples, stress detection values detected by ultrasonic stress detection system and X-ray stress analyzer are not the same, but the stress trend is basically the same. However, ultrasonic linear testing can only be used to measure larger stresses and to detect developed defects, it cannot effectively detect early microscopic damage of materials.

Non-linear ultrasonic testing is to use non-linear response generated by interaction between sound wave and microstructure of material to characterize the material performance and detect small defects. It essentially reflects the impact of microscopic performance changes on non-linearity of the material. Therefore, it can be used for the detection of stress distribution of metal plate structures. Principal harmonic method and frequency mixing method are widely used nonlinear ultrasonic testing techniques.

Scholars have conducted related studies on the stress changes of metallic materials by using nonlinear ultrasonic harmonic method. Jhang and Kim [JHANG, K. Y, KIM, et al. Evaluation of material degradation using nonlinear acoustic effect[J]. Ultrasonics, 1999, 37(1): 39-44.] In the structural steels SS41 and SS45, it is observed that the ultrasonic nonlinear parameters increase significantly with the increase of tensile stress, especially when the tensile stress is greater than the yield strength. Shui et al. [Shui G, Wang Y S, Gong F. Evaluation of plastic damage for metallic materials under tensile load using nonlinear longitudinal waves[J]. Ndt&E International, 2013, 55(3):1-8.] use nonlinear ultrasonic on-line method to detect AZ31 magnesium-aluminum alloy after different tensile stress, it was observed that the ultrasonic nonlinear parameter increased significantly after tensile stress was greater than the yield strength. Li Haiyang et al. [Li Haiyang, Wang Zhaoba, Gao Cuicui, Pan Qianghua, Xiao Yu. disclosed a method for online monitoring of strain changes in metallic materials with nonlinear ultrasound. Chinese patent: [CN201710271586.9 [P]0.2017-07-14.] disclosed a method for online monitoring of the strain changes of metallic materials with nonlinear ultrasonic, it realizes on-line monitoring of metallic materials and can evaluate the mechanical condition of in-service workpieces under long-term external load. Xu Guangchun and others [Xu Chunguang, He Lei, Wang Qiutao, Li Peilu, Lu Yuren, Pan Qinxue, Zhou Shiyuan, Xiao Dingguo, Hao Juan. disclosed a nonlinear ultrasonic detection method for residual stress: [CN201711305855.5[P]. 2018-06-29.] it uses the corresponding relationship between the second and third harmonics of the fundamental frequency wave and the residual stress, rapid detection of internal residual stress of large components is realized. Although the harmonic detection method is highly sensitive to early damage, the experimental system, probes and couplants can all produce second harmonics, making it impossible to distinguish whether the obtained harmonic components are caused by stress changes. Experimental results produce interference.

Aiming at the problem of mixing detection of stress distribution of plate structure, nonlinear ultrasonic mixing method is highly sensitive to the changes of material microstructure, and can well avoid interference of the system nonlinearity on experimental results. However, the research on stress detection using nonlinear ultrasonic mixing technology in domestic and foreign literature is still in exploratory stage. In summary, in view of the limitations of existing methods for metal plate structural stress detection and the high sensitivity of nonlinear ultrasonic mixing to early damage, this patent proposes a detection method for metal plate stress distribution based on nonlinear Lamb mixing technology.

SUMMARY

The present invention aims to provide a method for detecting the stress of a plate structure, particularly to a detection method for metal plate stress distribution based on nonlinear Lamb mixing technology. Piezoelectric ultrasonic probe is placed on both sides of the surface of test piece as excitation sensor, and the piezoelectric sensor with center frequency near the sum frequency signal is arranged between two excitation probes to receive the signal. Scan the test piece by changing probe excitation delay method to obtain time domain signals at different receiving positions. Extract sum-frequency component of difference signal for Fourier change, reflect the stress distribution of test piece according to the amplitude of sum-frequency signal, and determine the location of stress concentration area.

Basic principle of the method for stress distribution detection and stress concentration area location based on nonlinear ultrasonic mixing technology proposed in the present invention is:

In an isotropic medium, two elastic waves with frequencies f1 and f2 interact with a nonlinear source under certain conditions to produce a mixing (sum or difference frequency) wave with a frequency of fg. The specific conditions under which the above mixing nonlinear effects occur are called resonance conditions:

$$f_g = f_1 \pm f_2 \quad (1)$$

$$k_g = k_1 \pm k_2 \quad (2)$$

Wherein, k1, k2, kg are wave vectors of two fundamental frequency incident waves and mixing waves, "+" and "−" represent the sum frequency and difference frequency respectively. Equations (1) and (2) respectively define the conditions that frequency and propagation direction of two incident waves must meet when mixing effect of two incident waves occurs. FIG. 1 shows the geometric relationship between two fundamental frequency waves and mixing wave vector when two incident waves have mixing nonlinear effects.

Mixing resonance conditions of equations (1) and (2) can be applied to Lamb wave mixing, and the satisfaction of Lamb wave mixing resonance conditions depends on the dispersion characteristics of Lamb waves, as shown in FIG. 2.

Lamb wave has multi-modality and dispersion characteristics, which makes the research of Lamb wave mixing more complicated. For this reason, only nonlinear interaction between low-order Lamb waves (A0 wave, S0 wave) in plate structure is considered, and mixing wave generated by two Lamb waves is also a low-order Lamb wave. Therefore, there are three combinations of fundamental low-order Lamb waves: mixing of two S0 waves, mixing of two A0 waves, and mixing of A0 and S0 waves. According to the geometric relationship of FIG. 1 and formulas (1) and (2), resonance condition of Lamb wave mixing is:

$$(K_{sum})^2 = (K_1)^2 + (K_2)^2 + 2K_1K_2\cos\alpha \quad (4a)$$

$$(K_2)^2 = (K_1)^2 + (K_{sum})^2 - 2K_1K_{sum}\cos\psi \quad (4b)$$

$$(K_{dif})^2 = (K_1)^2 + (K_2)^2 - 2K_1K_2\cos\alpha \quad (5a)$$

$$(K_2)^2 = (K_1)^2 + (K_{dif})^2 - 2K_1K_{dif}\cos\psi \quad (5b)$$

Wherein, K1 and K2 are the wave numbers of two fundamental frequency Lamb waves, and Ksum and Kdif are the wave numbers of sum frequency and difference frequency Lamb waves, respectively. Equations (4) and (5) respectively give the resonance conditions that two Lamb waves interact to produce sum-frequency and difference-frequency Lamb waves.

Among them, wave numbers of the fundamental and mixed Lamb waves can be expressed as:

$$K_1 = \frac{2\pi f_1}{v_{p(f_1)}} \quad K_2 = \frac{2\pi f_2}{v_{p(f_2)}} \quad K_{sum} = \frac{2\pi(f_1+f_2)}{v_{p(f_1+f_2)}} \quad K_{dif} = \frac{2\pi(f_1-f_2)}{v_{p(f_1-f_2)}} \quad (6)$$

Wherein, $v_{p(f_1)}$ and $v_{p(f_2)}$ are phase velocities of two fundamental frequency Lamb waves, $v_{p(f_1+f_2)}$ and $v_{p(f_1-f_2)}$ are the phase velocities of sum and difference frequency Lamb waves. The above phase velocity can be obtained from Lamb wave phase velocity dispersion curve in FIG. 2a).

According to equations (4) and (5), when two Lamb waves interact to produce sum-frequency and difference-frequency Lamb waves, the fundamental Lamb interaction angle α and mixing wave scattering angle ψ can be expressed as:

$$\cos\alpha = \frac{1}{2}\frac{v_{p(f_1)}}{f_1}\frac{v_{p(f_2)}}{f_2}\left\{\left(\frac{f_1+f_2}{v_{p(f_1+f_2)}}\right)^2 - \left(\frac{f_1}{v_{p(f_1)}}\right)^2 - \left(\frac{f_2}{v_{p(f_2)}}\right)^2\right\} \quad (7a)$$

$$\cos\psi = \frac{1}{2}\frac{v_{p(f_1)}}{f_1}\frac{v_{p(f_1+f_2)}}{f_1+f_2}\left\{\left(\frac{f_1}{v_{p(f_1)}}\right)^2 + \left(\frac{f_1+f_2}{v_{p(f_1+f_2)}}\right)^2 - \left(\frac{f_2}{v_{p(f_2)}}\right)^2\right\} \quad (7b)$$

$$\cos\alpha = \frac{1}{2}\frac{v_{p(f_1)}}{f_1}\frac{v_{p(f_2)}}{f_2}\left\{\left(\frac{f_1}{v_{p(f_1)}}\right)^2 + \left(\frac{f_2}{v_{p(f_2)}}\right)^2 - \left(\frac{f_1-f_2}{v_{p(f_1-f_2)}}\right)^2\right\} \quad (8a)$$

$$\cos\psi = \frac{1}{2}\frac{v_{p(f_1)}}{f_1}\frac{v_{p(f_1-f_2)}}{f_1-f_2}\left\{\left(\frac{f_1}{v_{p(f_1)}}\right)^2 + \left(\frac{f_1-f_2}{v_{p(f_1-f_2)}}\right)^2 - \left(\frac{f_2}{v_{p(f_2)}}\right)^2\right\} \quad (8b)$$

It can be seen from equations (7) and (8) that the fundamental frequency Lamb wave interaction angle α and mixing wave scattering angle ψ are related to the frequencies and phase velocities of two fundamental frequency Lamb waves and mixing wave. According to this, resonant conditions for mixing nonlinear effect of two Lamb waves can be obtained. FIG. 3 shows the resonant conditions for mixing effect of two A0 waves to produce sum frequency S0 wave. As shown in FIG. 3, two rows of A0 waves interact at an interaction angle $\alpha=180°$, and there is a nonlinear source in action area, and a sum frequency S0 wave propagating along the scattering angle $\psi=0°$ will be generated.

The method for detecting stress distribution of a metal plate and locating the stress concentration area based on nonlinear Lamb wave mixing technology proposed by the present invention has the following specific implementation steps:

1) Signal excitation positions are respectively set at the left and right ends of one side of the thin plate containing stress concentration area, and signal receiving position is set in the middle of the detection path where two excitation probes are located.

2) According to the resonance conditions of two A0 waves mixed to produce sum frequency S0 wave, the frequencies f1 and f2 of two excitation signals in nonlinear ultrasonic mixing detection are determined, and two signal periods N1 and N2 are determined under the condition that duration of two excitation signals are matched.

3) In order to make two rows of ultrasonic waves of different frequencies reach the designated mixing position at the same time, time delay of the excitation signal is calculated according to the propagation speed and distance of ultrasonic waves in specimen.

4) According to the frequency, period and excitation delay conditions selected above, two excitation signals are excited at the same time, and the signal "a" is received at the receiving position.

5) Single excitation signal f1 receives signal b at the receiving position, single excitation signal f2, receives signal c at the receiving position, and two columns of received signals are linearly superimposed to generate a superimposed signal d=b+c.

6) Difference between received signal a and superimposed signal d is obtained, and the difference signal e is obtained. Observe whether there is a complete wave packet in difference signal, and preliminarily judge whether the test piece is damaged.

7) Fourier changes are performed on received signal a, superimposed signal d and difference signal e, and amplitude at the corresponding frequency of sum frequency signal is extracted.

If received signal a and received signal c have new waveforms compared with the superimposed signal d, and new frequency components appear both in frequency domain and frequency position, it indicates that the detection condition can achieve a certain position of test piece stress detection.

8) According to the propagation path of ultrasonic signal in specimen, time delay difference of the excitation signals of two probes is calculated, so that the excitation signals meet at different positions of specimen, a series of signals are received at the receiving position, and the sum frequency amplitude of difference signal at different positions is extracted.

9) By changing the signal excitation and receiving position, complete mixing frequency scan of entire test piece.

The amplitude of sum frequency difference signal obtained at different meeting positions is corresponding to the position point, and stress distribution result of the test piece is drawn.

10) According to the result of step 9), a specific threshold is selected to judge whether the stress is concentrated at each position.

When sum frequency amplitude of a certain location is greater than the threshold, it is considered that there is a stress concentration; otherwise, it is considered that there is no stress concentration.

The present invention has the following advantages:

1) A0 wave mixing method is used to detect the stress distribution of test piece, and the delay of excitation signal is changed to obtain the relationship between different encounter positions along propagation direction and the amplitude of sum frequency signal. It can realize the detection of stress distribution in plate structure and positioning stress concentration area.

2) Compared with the harmonic detection method, the frequency mixing detection method has flexible selectivity of excitation frequency, mode and interaction angle, which can effectively suppress the influence of system nonlinearity.

DESCRIPTION OF THE DRAWINGS

FIG. 1: Geometric relationship in non-linear effects of mixing; FIG. 1a: Sum component; FIG. 1b: Difference component.

FIG. 2: Dispersive curves for a 1-mm-thick aluminum plate; FIG. 2a: Phase velocity dispersion curve of 1 mm thick aluminum plate; FIG. 2b: Group velocity dispersion curve of 1 mm thick aluminum plate.

FIG. 3: Resonance condition of two A0 waves mixing to produce the sum frequency S0 wave.

FIG. 4: Schematic diagram of the experimental system.

FIG. 5: Received signal; FIG. 5a: Time-domain diagram of received signal at a certain point of the specimen; FIG. 5b: Frequency domain diagram of received signal at a certain point of the test piece.

FIG. 6: Bandpass filtered signal; FIG. 6a: Time-domain diagram of received signal at a certain point of the test piece after filtering; FIG. 6b: The frequency domain diagram of received signal at a certain point of the test piece after filtering.

FIG. 7: Schematic diagram of Lamb wave delay excitation scanning mode.

FIG. 8: Nonlinear ultrasonic detection results; FIG. 8a: Two-dimensional results of ultrasonic testing of stress distribution; FIG. 8b: Three-dimensional results of ultrasonic testing of stress distribution.

PREFERRED EMBODIMENT

The implementation process of stress distribution detection method based on two rows of A0 wave nonlinear inverse collinear mixing will be described in detail below with figures.

1) Connect each experimental instrument according to FIG. 4 and arrange the experimental probe.

Test piece selected in this experiment is 45Mn steel, and its size is a thin plate with a length of 30 mm, a width of 20 mm, and a thickness of 2.5 mm.

A milling zone with a length of 20 mm and a width of 7.5 mm is included in the center of the length of the specimen.

2) Excitation positions of the excitation signals f1 and f2 are respectively set at the left and right ends of the model, and receiving position is set 150 mm from the left end surface in the length direction.

3) According to two columns of A0 wave mixing resonance conditions in FIG. 3, it is determined that the frequencies f1 and f2 of two excitation signals in non-linear Lamb wave reverse collinear mixing detection are 0.813 MHz and 0.316 MHz, respectively, and the delay of excitation signal f1 is set to 3.4 e−6 µs, select excitation signal period to be 40 and 10 period Hanning window modulated sinusoidal signal, when the mixing effect occurs, interaction angle α of two fundamental frequency A0 waves and scattering angle ψ of sum frequency S0 wave are respectively 180°, 0°.

4) Two excitation probes are excited at the same time according to the selected frequency, period and excitation delay, and signal a is received at receiving position.

5) Single excitation signal f1 receives signal b at receiving position, and single excitation signal f2 receives signal c at receiving position. Two columns of received signals are linearly superimposed to generate a single excitation superimposed signal d=b+c.

6) Difference signal e=receiving simultaneous excitation signal a-superimposed signal d, observe whether there is a complete wave packet in mixing signal, and preliminarily judge whether the test piece is damaged, as shown in FIG. 5a).

7) Fourier changes are performed on received signal a, superimposed signal d and difference signal e to extract amplitude of the mixed signal. If both the received signal a and the received signal c have new waveforms compared with the superimposed signal d, and new frequency components appear in the frequency domain and frequency position, it indicates that material damage occurs in the specimen, otherwise there is no damage occurs in the specimen, as shown in FIG. 5b), the received signal is processed by bandpass filtering to extract the sum frequency components. Center frequency of filter is 1.2 MHz, the bandwidth is 0.2 MHz, the filtered time domain signal and its frequency spectrum is shown in FIG. 6.

8) According to the propagation path of ultrasonic signal in the specimen, time delay difference of excitation signals of two probes is calculated, so that the excitation signals meet at different positions of the specimen, a series of signals are received at the receiving position, and the sum frequency amplitude of difference signal at different positions is extracted.

9) By changing the signal excitation and receiving position, complete the mixing scan of the entire test piece, the scan plan is shown in FIG. 7. Amplitude of the sum frequency difference signal obtained at different meeting positions is corresponding to the position point, and stress distribution result of the test piece is drawn, which is shown in FIG. 8.

10) According to the result of step 9), the different encounter positions and frequency signal amplitudes are normalized, and a threshold value of 0.6 is selected to judge whether there is damage at each position. When the sum frequency amplitude of a certain position is greater than 60% of the maximum sum frequency amplitude, it is considered that there is a stress concentration here; otherwise, it is considered that there is no stress concentration here.

Above is a typical application of the present invention. Application of the present invention is not limited to the stress distribution detection of 45Mn steel plates, but can also be used for the stress distribution detection of plate structures of other metals.

We claim:

1. A non-linear Lamb wave mixing method for measuring stress distribution in a thin metal plate comprising:

in an isotropic medium, two elastic waves with frequencies f1 and f2 interact with a nonlinear source under certain conditions to produce a mixing wave with a frequency of fg, the mixing wave is a sum or difference frequency wave; the specific conditions under which above mixing nonlinear effects occur are called resonance conditions;

resonance condition of a mixing frequency of two A0 waves is $$(K_{sum})^2 = (K_1)^2 + (K_2)^2 + 2K_1K_2\cos\alpha \qquad (1a)$$

$$(K_2)^2 = (K_1)^2 + (K_{sum})^2 - 2K_1K_{sum}\cos\psi \qquad (1b)$$

wherein, k1 and k2 are wave vectors of two fundamental frequency incident waves and mixing waves, $K_{sum}$ is wave number of sum frequency Lamb wave, equation (1) gives the resonance conditions that need to be satisfied for interaction of two Lamb waves to produce sum frequency Lamb waves; where, the wave numbers of fundamental frequency and frequency Lamb wave are respectively expressed as:

$$K_1 = \frac{2\pi f_1}{v_{p(f_1)}} \quad K_2 = \frac{2\pi f_2}{v_{p(f_2)}} \quad K_{sum} = \frac{2\pi(f_1+f_2)}{v_{p(f_1+f_2)}} \qquad (2)$$

wherein, $v_{p(f_1)}$ and $v_{p(f_2)}$ is phase velocity of two-base-frequency Lamb wave, and $v_{p(f_1+f_2)}$ is phase velocity of sum frequency Lamb wave; the phase velocity can be obtained from phase velocity dispersion curve of Lamb wave;

according to Equation (1), when the interaction of two Lamb waves produces sum frequency Lamb waves, interaction angle α of the fundamental frequency Lamb and scattering angle ψ of the mixed-frequency wave are:

$$\cos\alpha = \frac{1}{2}\frac{v_{p(f_1)}}{f_1}\frac{v_{p(f_2)}}{f_2}\left\{\left(\frac{f_1+f_2}{v_{p(f_1+f_2)}}\right)^2 - \left(\frac{f_1}{v_{p(f_1)}}\right)^2 - \left(\frac{f_2}{v_{p(f_2)}}\right)^2\right\} \qquad (3a)$$

$$\cos\psi = \frac{1}{2}\frac{v_{p(f_1)}}{f_1}\frac{v_{p(f_1+f_2)}}{f_1+f_2}\left\{\left(\frac{f_1}{v_{p(f_1)}}\right)^2 + \left(\frac{f_1+f_2}{v_{p(f_1+f_2)}}\right)^2 - \left(\frac{f_2}{v_{p(f_2)}}\right)^2\right\} \qquad (3b)$$

according to Equation (3), interaction angle α and scattering angle ψ of the fundamental Lamb wave are correlated with frequency phase velocity of two-fundamental Lamb wave and mixed-frequency wave, so the resonance condition for nonlinear mixing effect of two Lamb waves can be obtained;

wherein the non-linear Lamb wave mixing method is implemented in the following steps:

1) signal excitation positions are respectively set at a left end and a right end of one side of a thin plate containing stress concentration area, and signal receiving position is set in the middle of a detection path where two excitation probes are located;

2) according to the resonance conditions of two A0 waves mixed to produce sum frequency S0 wave, the frequencies f1 and f2 of two excitation signals in nonlinear ultrasonic mixing detection are determined, and two signal periods N1 and N2 are determined under the condition that duration of two excitation signals are matched;

3) in order to make two rows of ultrasonic waves of different frequencies reach a designated mixing position at the same time, time delay of the excitation signal is calculated according to propagation speed and distance of ultrasonic waves in specimen;

4) according to the frequency, period and excitation delay conditions selected above, two excitation signals are excited at the same time, and the signal "a" is received at the receiving position;

5) single excitation signal f1 emitted from a first excitation sensor is received at the signal receiving position and labeled as signal b, single excitation signal f2 emitted from a second excitation sensor is received at the signal receiving position and labeled as signal c, and signal b and signal c are linearly superimposed to generate a superimposed signal d=b+c;

6) difference between received signal a and superimposed signal d is obtained, and a difference signal e is obtained; observe whether there is a complete wave packet in difference signal, and preliminarily judge whether a test piece is damaged;

7) fourier changes are performed on received signal a, superimposed signal d and difference signal e, and amplitude at a corresponding frequency of sum frequency signal is extracted;

if received signal a and received signal c have new waveforms compared with the superimposed signal d, and new frequency components appear both in frequency domain and frequency position, it indicates that the detection condition can achieve a certain position of test piece stress detection;

8) according to a propagation path of ultrasonic signal in specimen, time delay difference of the excitation signals of two probes is calculated, so that excitation signals meet at different positions of specimen, a series of signals are received at a receiving position, and the sum frequency amplitude of difference signal at different positions is extracted;

9) by changing the signal excitation and receiving position, complete mixing frequency scan of entire the test piece; an amplitude of sum frequency difference signal obtained at different meeting positions is corresponding to the position point, and stress distribution result of the test piece is drawn;

10) according to the result of step 9), a specific threshold is selected to judge whether the stress is concentrated at each position;

when sum frequency amplitude of a certain location is greater than the threshold, it is considered that there is a stress concentration; otherwise, it is considered that there is no stress concentration.

* * * * *